United States Patent
Simmons

(10) Patent No.: US 10,309,596 B2
(45) Date of Patent: Jun. 4, 2019

(54) LIGHTING APPARATUS INCLUDING PRIMARY AND SECONDARY ILLUMINATION SOURCES AND CIRCUIT CONTROLLING THE SAME

(71) Applicant: Michael L. Simmons, Haymarket, VA (US)

(72) Inventor: Michael L. Simmons, Haymarket, VA (US)

( * ) Notice: Subject to any disclaimer, the term of this patent is extended or adjusted under 35 U.S.C. 154(b) by 0 days.

(21) Appl. No.: 14/901,998

(22) PCT Filed: Sep. 1, 2014

(86) PCT No.: PCT/US2014/053631
§ 371 (c)(1),
(2) Date: Dec. 29, 2015

(87) PCT Pub. No.: WO2015/003191
PCT Pub. Date: Jan. 8, 2015

(65) Prior Publication Data
US 2016/0377246 A1 Dec. 29, 2016

Related U.S. Application Data

(60) Provisional application No. 61/890,447, filed on Oct. 14, 2013.

(51) Int. Cl.
| | |
|---|---|
| *F21S 9/02* | (2006.01) |
| *F21K 9/275* | (2016.01) |
| *F21V 33/00* | (2006.01) |
| *H05B 37/04* | (2006.01) |
| *H02J 9/06* | (2006.01) |
| *F21Y 115/10* | (2016.01) |

(52) U.S. Cl.
CPC .............. *F21S 9/024* (2013.01); *F21K 9/275* (2016.08); *F21V 33/0076* (2013.01); *H05B 37/04* (2013.01); *F21Y 2115/10* (2016.08); *H02J 9/061* (2013.01)

(58) Field of Classification Search
CPC ...... F21S 9/024; F21K 9/275; F21V 33/0076; H05B 37/04
USPC ...................... 315/160, 209 R, 129
See application file for complete search history.

(56) References Cited

U.S. PATENT DOCUMENTS

| | | | |
|---|---|---|---|
| 4,749,908 A * | 6/1988 | Stifter ...................... H02J 9/02 307/11 |
| 4,803,605 A | 2/1989 | Schaller et al. | |
| 5,365,145 A * | 11/1994 | Fields ...................... H02J 9/02 307/66 |
| 7,045,964 B1 * | 5/2006 | Hermans .................. H02J 9/065 307/64 |
| 7,391,159 B2 | 6/2008 | Harwood | |
| 8,253,347 B2 * | 8/2012 | Fiermuga ............ F21V 33/0076 315/129 |
| 8,415,901 B2 * | 4/2013 | Recker ............... H05B 33/0803 315/172 |
| 9,078,313 B2 * | 7/2015 | Recker ............... H05B 33/0815 |
| 9,955,551 B2 * | 4/2018 | Spero .................... F21S 41/143 |
| 2002/0047627 A1 * | 4/2002 | Pickering ................ H02J 9/065 315/291 |

(Continued)

*Primary Examiner* — Anabel Ton
(74) *Attorney, Agent, or Firm* — Richard C. Litman

(57) ABSTRACT

A lighting apparatus is provided that is able to illuminate despite the loss of a primary source of power. In implementation, a controller is provided for determining if a loss of normal power has occurred so that a first source of illumination cannot function. In that case, a second power source is provided to supply energy to a second source of illumination. Further, the first and second sources of illumination may use the same switch such that a users inconvenience is minimized.

2 Claims, 3 Drawing Sheets

(56) References Cited

U.S. PATENT DOCUMENTS

| | | | |
|---|---|---|---|
| 2004/0051466 A1* | 3/2004 | Liu | H02J 9/02 |
| | | | 315/149 |
| 2006/0076896 A1* | 4/2006 | Osborn | H05B 37/0209 |
| | | | 315/86 |
| 2010/0135000 A1 | 6/2010 | Smith, III et al. | |
| 2011/0193482 A1* | 8/2011 | Jones | H05B 37/04 |
| | | | 315/87 |

* cited by examiner

LIGHTING APPARATUS INCLUDING PRIMARY AND SECONDARY ILLUMINATION SOURCES AND CIRCUIT CONTROLLING THE SAME

BACKGROUND OF THE INVENTION

1. Field of the Invention

The present invention relates to lighting including back-up or emergency lighting. More particularly, the present invention relates to an apparatus and method for providing a primary lighting source and a secondary lighting source that provides illumination in the event that power is not available to the primary lighting source.

2. Description of the Related Art

Many different lighting fixtures are known in the art. Examples of such lighting fixtures include flush mounted lighting fixtures such as recessed lights, and surface mounted lighting fixtures such as a ceiling mounted fixture, a wall sconce, a shop light (e.g., a 2'×2', 2'×4', 1'×8', etc. fixture), and the like. As is also known in the art, such lighting fixtures are provided with one or more illumination sources such as an incandescent bulb, a fluorescent bulb, a Light Emitting Diode (LED), and the like. As is further known in the art, the lighting fixture, including the choice of bulb and corresponding circuitry, is designed to receive a single source of power to cause the illumination source to illuminate when desired by a user. For example, a recessed lighting fixture is typically designed with any of a florescent bulb, an incandescent bulb or an LED and provided with a switched source of Alternating Current (AC) power that is controlled by a user when the user desires to illuminate the lighting fixture. More specifically, a typical lighting fixture is connected to a branch circuit of a residential or commercial building and controlled by a wall switch.

However, the lighting fixtures of the prior art include a single illumination source that is capable of receiving power from a single source of power. As such, if the single source of power is unavailable, the illumination source of the lighting fixture cannot illuminate, defeating the purpose of the lighting fixture and frustrating the user. For example, if there is a loss of power to a residential or commercial building, the lighting fixture of the prior art cannot function because the branch circuit that provides power to the illumination source is unavailable.

Accordingly, there is a need for a lighting apparatus that remains able to illuminate upon loss of a single source of power and a circuit for controlling the same.

BRIEF SUMMARY OF THE INVENTION

Aspects of the present invention are to address at least the above-mentioned problems and/or disadvantages and to provide at least the advantages described below. Accordingly, an aspect of the present invention is to provide a lighting apparatus that is able to illuminate despite the loss of a primary source of power and a circuit controlling the same.

Another aspect of the present invention is to provide a lighting apparatus including a primary illumination source and a secondary illumination source and a circuit controlling the same.

Still another aspect of the present invention is to provide a lighting apparatus including a primary illumination source, a secondary illumination source, a first source of power and a second source of power, and a circuit controlling the same.

Another aspect of the present invention is to provide a lighting apparatus including a primary illumination source, a secondary illumination source, a first source of power and a second source of power, and a circuit controlling the same wherein, upon loss of the first source of power, the second source of power remains available to provide power to the second illumination source using the control circuit such that a user remains able to control the lighting apparatus to provide desired light.

Yet another aspect of the present invention is provide a lighting apparatus including a primary illumination source, a secondary illumination source, a first source of power and a second source of power, and a circuit controlling the same configured for installation as a back-fit or retro-fit for use with existing wiring in a residential or commercial building.

Yet another aspect of the present invention is to provide a lighting apparatus including a primary illumination source, a secondary illumination source, a first source of power and a second source of power, and a circuit controlling the same configured for use in a new installation.

Still another aspect of the present invention is to provide a lighting apparatus configured for installation in a new residential or commercial building.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a lighting apparatus having a first source of power and a second source of power for connection to a first source of illumination and a second source of illumination. In an exemplary implementation, the first source of power is a branch or other circuit typically found in a residential or commercial building while the second source of power is a battery. Also, the first and second sources of illumination may be any of an incandescent bulb, a fluorescent bulb, a Light Emitting Diode (LED), an Organic Light Emitting Diode (OLED), an Active Matrix OLED (AMOLED), a High Intensity Discharge (HID) lamp, and the like, while the second source of illumination is preferably an LED, an OLED, an AMOLED, or other illumination source that has a relatively low power requirement.

Exemplary embodiments of the present invention further provide a circuit for controlling a first source of power and a second source of power to illuminate the first and second sources of illumination. In an exemplary implementation, the second source of power is supplied to the second illumination source when the first source of power becomes unavailable. For example, the second source of power may provide power when the first source of power is unavailable due to a loss of power to the residential or commercial structure in which the circuit is located.

An exemplary lighting apparatus and circuit for controlling the same will be described with reference to FIG. 1.

Figure 1:
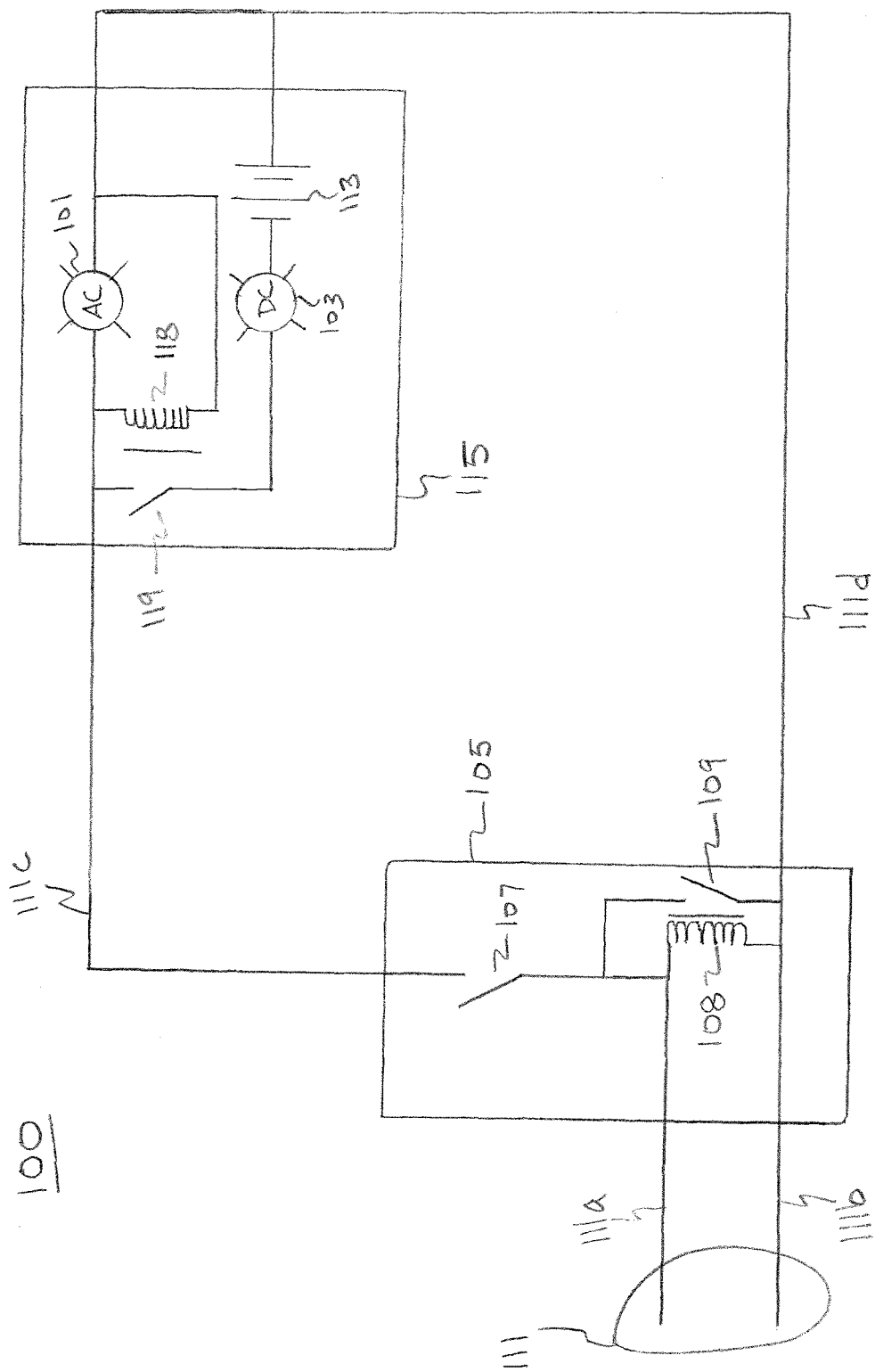
FIG. 1 illustrates a lighting apparatus including a first illumination source, a second illumination source, a first source of power, a second source of power, and a circuit for controlling the same.

FIG. 1 illustrates a lighting apparatus including a first illumination source, a second illumination source, a first source of power, a second source of power, and a circuit for controlling the same.

Referring to FIG. 1, a lighting apparatus 100 includes a first illumination source 101, a second illumination source 103, a controller 105, a first source of power 111, a second source of power 113, and a lighting fixture 115. As will be explained in more detail below, the controller 105 is configured in conjunction with the lighting fixture 115 to provide control of a backup source of power so that a user may selectively switch on or off a backup source of illumination when a normal source of power is lost.

In an exemplary implementation, the first illumination source 101 is an LED powered by the first source of power 111, the second illumination source 103 is an LED powered by the second source of power 113, the first source of power 111 is a branch circuit of a residential or commercial building in which the lighting apparatus is located, and the second source of power 113 is a battery. Of course, as described above, these are all merely examples of sources of illumination and power and should not be construed as limiting. For example, the first illumination source 101 may be any of an incandescent bulb, a fluorescent bulb, an OLED, an AMOLED, an HID lamp, and the like, while the second source of illumination 103 may be an OLED, an AMOLED, or other illumination source. Furthermore, the first source of power 111 may be any source of power that is able to supply sufficient power to illuminate the first illumination source 101. For example, aside from or in addition to a branch circuit, the first source of power 111 may be any one or more of a solar panel, a battery, a capacitor, etc. that is able to provide sufficient power to illuminate the first illumination source 101. Also, the second source of power 113 may be any source of power that is able to supply sufficient power to illuminate the second illumination source 103. For example, aside from or in addition to a battery, the second source of power 113 may include a solar panel, a branch or other circuit provided in a residential or commercial building, a capacitor, etc. that is able to supply sufficient power to illuminate the second illumination source 103. Notably, the first source of power 111 and the second source of power 113 may both be either an Alternating Current (AC) source of power or a Direct Current (DC) source of power. Also, if either the first source of power 111 or the second source of power 113 is implemented using a battery, the battery may be either a single use battery or a rechargeable battery, may be any composition of battery such as a nickel-metal-hyrdride battery, a lithium-ion battery, a lead-acid battery, and the like, and may be any voltage and power rating (e.g., amp-hour rating, current rating, etc.) sufficient to provide power to the respective illumination source to which it is connected. For example, the second source of power 113 may be implemented as a 9v DC battery that is coupled to or otherwise located proximate the lighting fixture 115. In an alternative implementation, the second source of power 113 may be located remotely from the lighting fixture 115.

In the example of FIG. 1, the first source of power 111 is a branch circuit provided in a residential or commercial building in which the lighting apparatus 100 is located. In such an exemplary implementation, the first source of power 111 may be an existing branch circuit in a residential or commercial building in which the lighting apparatus 100 is located. That is, the lighting apparatus 100 of FIG. 1 may be used in conjunction with an existing branch circuit of a residential or commercial building in which the lighting apparatus 100 is to be installed. In that case, lighting apparatus 100 may be used as a back-fit or retro-fit application that is used with existing wiring of the residential or commercial structure to provide both a normal source of illumination and a backup source of illumination as well as control of the backup source of illumination when power is lost to the normal source of illumination.

In more detail, the first source of power 111 may include a first conductor 111a as a line or power conductor, and a second conductor 111b as a neutral or ground conductor. Such an implementation is commonly found in a branch circuit of a residential or commercial building in which a typical 3-wire cable is provided. For example, the first source of power 111 may be a 3 conductor, 12 ga. or 14 ga. cable that provides a 120v AC source of power as part of a branch circuit. Furthermore, the first source of power 111 also includes a third conductor 111c and a fourth conductor 111d. In an exemplary implementation, the first through fourth conductors 111a-d may be existing conductors found in a residential or commercial building. That is, an exemplary embodiment of the present invention provides control of a normal source of illumination and of an emergency or back-up source of illumination without the need for new or additional wiring. For example, by simply replacing an existing wall mounted switch and an existing bulb controlled by the existing wall mounted switch with inventive components described herein, such as the controller 105 and the lighting fixture 115, a user is able to control two sources of power for two sources of illumination such that, when the normal source of power (i.e., the branch circuit) is not available, a user remains able to control and provide a source of illumination.

In an exemplary implementation, the controller 105 includes a switch 107 and a relay 108.

The switch 107 is provided as a source of control for a user. In an exemplary embodiment, the switch 107 is a flip switch with which a user may control the first illumination source 101 and/or the second illumination source 103. In alternative exemplary embodiments, the switch 107 may be a rotary switch, a push-button switch, a remotely controlled switch controlled by either or both an audible or an electrical signal, a timed switch, an occupancy sensing switch, a switch including a dimmer function (e.g., a single toggle switch with a sliding dimmer, a rotating dimmer, etc.), a three-way switch, and the like. For purposes of description, the switch 107 may be considered similar to a switch commonly found in a residential or commercial building.

Switch 107 includes a first contact or lead and a second contact or lead such that when the switch is closed, an electrical connection is made between the first contact and the second contact. The first contact of the switch 107 is connected to the first conductor 111a of the first source of power 111. The second contact of the switch 107 is connected to the lighting fixture 115 by the third conductor 111c. As will be explained in more detail below, the switch 107 is able to control power from the first source of power 111 to the first illumination source 101 and from the second source of power 113 to the second illumination source 103.

The relay 108 includes a contact 109 whose position is controlled by the state of the relay 108. That is, the contact 109 is either open or closed depending on the state of the relay 108. In an exemplary implementation, the contact 109 is a normally closed contact such that contact 109 is closed if the relay 108 is de-energized and open if the relay 108 is energized. As illustrated in FIG. 1, a first contact of the relay 108 is connected to the first conductor 111a of the first source of power 111 as well as the first contact of the switch 107 while a second contact of the relay 108 is connected to the second conductor 111b of the first source of power 111. In this manner, and as will be explained in more detail below, the relay 108 is able to monitor a state of the first source of power 111 such that, if the first source of power 111 is unavailable, the switch 107 allows a user to control the providing of power from the second source of power 113 to the second illumination source 103 so that a source of illumination is always available to the user.

In the illustrated example of FIG. 1, the lighting fixture 115 includes the first illumination source 101, the second illumination source 103, the second source of power 113, a second relay 118, and a second contact 119. As described above, the first illumination source 101 and the second illumination source 103 may each include an LED, an OLED, an AMOLED, and the like. The second source of power 113 may include a battery. Of course, these are merely examples. For example, the second source of power 113 may be other than a battery and may be located remotely from the lighting fixture 115. Moreover, in implementation, a second source of power 113 may be electrically connected and thus provide power to two or more lighting fixtures 115 or otherwise to two or more lighting apparatuses 100.

A first contact of the first illumination source 101 is connected to the line or power conductor 111c of the first source of power 111 and a second contact of the first illumination source 101 is connected to the neutral or ground conductor 111d of the first source of power 111. For purposes of description, the configuration of the first illumination source 101 and the first source of power 111 is similar to a typical installation of a light that receives power from a branch circuit in an existing residential or commercial building. The first contact of the first illumination source 101 is also connected to a first contact of the second relay 118 while the second contact of the first illumination source 101 is connected to a second contact of the second relay 118.

The second relay 118 is provided to determine a status of the first source of power 111. As illustrated in FIG. 1, the first contact of the second relay 118 is connected to the third conductor 111c of the first source of power 111 and the second contact of the second relay 118 is connected to the fourth conductor 111d of the first source of power 111. Accordingly, if a voltage differential is provided by the third and fourth conductors 111c and 111d of the first source of power 111, the second relay 118 will detect the voltage differential.

The second contact 119 is provided as a means of controlling the second source of illumination 103. In an exemplary implementation, the second contact 119 is a normally closed contact. As such, if the second relay 118 is energized, the second contact 119 is open and if the second relay 118 is de-energized, the second contact 119 is closed. The second contact 119 is electrically between the third conductor 111c of the first source of power 111 and the second illumination source 103. Having this arrangement, the contact 119 allows a user to control the second source of illumination 103 when power is unavailable to the first source of illumination 101.

In operation, the lighting apparatus 100 may be implemented to function as follows. During a 'normal' operating period in which power is available from the first source of power 111, the switch 107 will allow a user to illuminate the first illumination source 101 using the first source of power 111. More specifically, if there is a voltage differential across the first and second conductors 111a and 111b of the first source of power, the first relay 108 will be energized by that voltage differential and the first contact 109 will be open. As such, if a user desires light from the lighting fixture 115, the user is able to close the switch 107 such that power is provided from the first source of power 111 to the lighting fixture 115. When power is provided from the first source of power 111 to the lighting fixture 115 by the switch 107, a circuit including the first source of illumination 101 is formed such that the first source of illumination 101 is lit. Also, the second relay 118 detects and is energized by the power provided from the first source of power 111 such that second contact 119 is open. As such, the second source of illumination 103 is not part of the circuit and therefore does not illuminate. Thus, in a 'normal' state in which the first source of power 111 is available, a user is able to selectively illuminate the first source of illumination 101.

In a 'back-up' or 'emergency' state in which the first source of power 111 is not available, the controller 105 functions with the lighting fixture 115 to allow the user to control the second source of illumination 103 using the switch 107. In more detail, if the first source of power 111 is not available, the first relay 108 is de-energized such that the first contact 109 is closed. Furthermore, because power is not provided by the third and fourth conductors 111c and 111d of the first source of power 111, the second relay 118 is de-energized such that the second contact 119 is closed. Under those conditions, the switch 107 is able to complete a circuit including the second source of illumination 103 and the second source of power 113. Accordingly, by means of the switch 107, the user is able to control a source of illumination (i.e., the second source of illumination 103) as desired even though a 'normal' source of power (i.e., first source of power 111) is not available.

The lighting apparatus 100 was illustrated in FIG. 1 and described above in terms of specific components. For example, the controller 105 was described as including a relay 108 having an associated contact 109 to provide certain functions such as determining if a voltage from the first power source 111 is available and controlling its application. However, it is to be understood that this is merely for sake of convenience and not by way of limitation. That is, the scope of the present invention includes not only the above described components but also their equivalents. For example, although element 108 is illustrated as a relay, it is not to be inferred that the scope of the present invention is limited to a mechanical relay. Rather, the above described functions may be achieved by any capable components such as solid state components, an Application Specific Integrated Circuit (ASIC), etc.

Furthermore, although the first illumination source 101 is illustrated as "AC" in FIG. 1 and described as provided power directly from the first power source 111 which may include a branch circuit, it is to be understood that this is merely for convenience of description. That is, and as described above, the first illumination source 101 may be any of an incandescent bulb, a florescent bulb, an LED, etc., which may each be powered by a different and/or distinct type of power. Accordingly, although not illustrated, it is understood that the lighting apparatus 100 may include additional elements as may be needed to regulate, control, or otherwise provide proper operation of the first illumination source 101. For example, although not illustrated, it is to be understood that, if the first illumination source 101 is implemented as an LED and the first source of power 111 is implemented as a 120v AC branch circuit, the lighting apparatus 100 may further include circuitry necessary to rectify and control the AC power of the first source of power 111 to supply DC power to the LED. As a specific example, the lighting apparatus may include an LED driver for either or both the first illumination source 101 and the second illumination source 103. Also, it is to be understood that although the first illumination source 101 and the second illumination source 103 are illustrated as single bulbs or LEDs, this is merely for convenience and not to be construed as limiting. Rather, both the first illumination source 101 and the second illumination source 103 may comprise any number of bulbs or LEDs. Also, if both are implemented using LEDs, the first illumination source 101 and the second illumination source 103 may include a different number of LEDs, different types of LEDs, and the like. For example, the first illumination source 101 may include a greater number of LEDs than the second illumination source 103, or include LEDs having a greater output (e.g., higher lumens) that the LEDs of the second illumination source 103. It is also to be understood that, if so implemented, the number and rating of the LEDs of the second illumination source 103 may vary depending on a variety of factors, such as the location of the lighting fixture 115, the rating of the second source of power 113, the need for back up lighting based on safety concerns and the like, and similar factors.

Moreover, while an exemplary lighting apparatus 100 including various components (e.g., controller 105, lighting fixture 115, etc.) has been described, it is to be understood that there are many additional components, parts, accessories, and the like which may be further included. For example, if the lighting apparatus 100 is implemented having a battery as the second source of power 113, the lighting apparatus 100 may further include an AC-to-DC converter to charge the battery (e.g., using the first source of power 111 as a source of AC power), as well as additional circuitry to control the converter and battery charging in general. Also, the lighting apparatus 100 may further include additional relays, contacts, switches, power sources, resistors, capacitors, inductors, integrated circuits, control circuitry, and the like with which to provide additional control for the lighting apparatus 100. For example, the lighting apparatus 100 may include components for a user to remotely control the lighting fixture 115. Moreover, if the second source of power 113 is implemented as a battery, the lighting apparatus 100 may also include an indication regarding the status of the second source of power 113. For example, the indication may include one or more lights coupled to the lighting fixture 115 to indicate that the second source of power 113 is fully or sufficiently charged, fully discharged or in a state such that a charge is necessary, charging, discharging, and the like. Of course, such indication may be located remotely from the lighting fixture 115, such as at the controller 105, at a location near the controller 105 or lighting fixture 115, or elsewhere at the convenience or direction of the user. Similarly, indication may be provided concerning a general state of the lighting apparatus 100 such as an indication regarding the status of relays 108 or 118, the contacts 109 or 119, the first and second sources of illumination 101 and 103, and the like.

As explained above, the lighting apparatus 100 illustrated in FIG. 1 may be implemented as a back-fit or retro-fit installation such that it may be easily installed in an existing commercial or residential building. In such an exemplary embodiment, the invention may be implemented substantially as illustrated in FIG. 1. That is, the lighting apparatus 100 would be installed having a controller 105 including a switch 107 and a first relay 108 having a first contact 109 as a replacement for an existing switch, such as a wall switch, as well as installed having a lighting fixture 115 including a first source of illumination 101, a second source of illumination 103, a second relay 118 having a second contact 119, and a second source of power 113 as a replacement for an existing lighting source such as an incandescent, fluorescent, or LED based lighting source typically found in a residential or commercial building. By way of such an implementation, the user would be provided with primary and secondary sources of illumination, as well as a secondary source of power to supply at least the secondary source of illumination upon loss of a primary source of power and a means to control both the primary and secondary sources of illumination without the need to install any additional wiring between the controller and the lighting fixture. Thus, a user is provided with control of a source of illumination even upon loss of power to a residential or commercial building while also provided with a convenient means of installation.

In another exemplary embodiment, the lighting apparatus may be provided as part of a new installation in a residential or commercial building. In that case, additional parts, components, etc. may be included so as to provide additional indications, control, and the like of either or both of the primary and secondary sources of illumination. For example, a controller may be provided having a first switch and a second switch to respectively control a first source of illumination and a second source of illumination. As described above, either or both of the first and second switches may be implemented in a plurality of ways. That is, either or both of the switches may be a toggle switch, a switch having a dimming function, a push-button switch, a rotating switch, and the like. Furthermore, the lighting apparatus may be installed with additional wiring provided between a controller and a lighting apparatus. For example, while the lighting apparatus 100 illustrated in FIG. 1 is provided having two wires (i.e., 111*c* and 111*d*) between the controller 105 and the lighting fixture 115, another exemplary implementation may include 3 or more wires between a controller and a lighting fixture. In such an installation, additional controls, indications, and the like may be provided to the user such as individual and simultaneous control of both a first source of illumination and a second source of illumination, control of more than one lighting fixtures, remote control of one or more lighting fixture, and the like.

In implementation of the present invention, the lighting fixture may take many forms. For example, the lighting fixture may be implemented as a back-fit or retro-fit application for a recessed light, such as a 3 inch, a 4 inch, a 5 inch, or a 6 inch diameter recessed light, and the like. In that case, the first illumination source of the lighting apparatus may be any of an incandescent type, a florescent type, an LED type, and the like and may simply be the same type as it is replacing. The second illumination source may include one or more LED or other source having a relatively low power requirement, while the second source of power may include a battery. In that case, the one or more LED may be located in any of a plurality of locations on the lighting fixture. For example, the one or more LED may be located on or within a lens that covers the first source of illumination, on a housing of the lighting fixture, and the like.

As a more specific example, there currently exist LED based lights that are used to retro-fit a recessed lighting installation. In that case, the retro-fit LED light includes a screw-in assembly having not only an LED based lighting source but also a lip or rim that substantially matches the outer design of the replaced recessed light such that an ornamentally pleasing installation is achieved for the user. Of course, such a retro-fit application is only provided with a single source of illumination such that, upon a loss of normal power, the single source of illumination is not available, thus inconveniencing the user. For such an implementation, the presently described second source of illumination may be located in one or more of a plurality of locations. For example, the second source of illumination may be placed on or within a lens that covers the first source of illumination. In more detail, if both the first and second sources of illumination are implemented as one or more LEDs, the LEDs comprising the second source of illumination may be interspersed among the LEDs comprising the first source of illumination. Alternatively, the LEDs comprising the second source of illumination may be located on an exterior surface of the lens, located on the lip or rim of the assembly, or located in any manner so as to provide a lighting source. Moreover, the LEDs comprising the second source of illumination may be configured such that their orientation can be changed. For example, the LEDs comprising the second source of illumination may be implemented such that the direction in which they project light can be changed, such that their focus can be changed, and the like. Even further, the recessed light may be configured with a first source of illumination around a periphery and having a recess located at or near its center that is configured to rotatably receive a second source of illumination. In that case, the second source of illumination as well as a second power source may be configured together so as to screw into the lighting fixture that includes the first source of illumination.

In another exemplary implementation, the lighting fixture may be implemented to replace a florescent light. For example, there currently exist many florescent based lighting fixtures such as a 2'×2' fixture, a 2'×4' fixture, a 1'×8' fixture, and the like. These fixtures typically include one or more florescent lights in the form of a tube (e.g., a T8 tube, a T12 tube, etc.), a ballast to convert and supply power to the florescent tubes, and a lens or a reflector assembly to disperse the light emitted from the tubes. A lighting fixture of the present invention may be implemented in a variety of ways so as to replace each of the florescent tubes, the ballast, and the lens and/or reflector assembly. For example, it may be assumed that an existing florescent based light is implemented as a 2'×4' fixture including three florescent tubes, necessary ballast, and a lens to cover the tubes and disperse the light. In implementation, the present invention may be configured as a 2'×4' lens on which both a first source of illumination and a second source of illumination are mounted, wherein both the first and second sources of illumination include one or more LED. Moreover, the assembly including the lens would include necessary wiring, circuit components, a second power source, etc. such that the first and second sources of illumination may be electrically connected as described above and as illustrated in FIG. 1. In that case, the invention may be used to back-fit or retro-fit an existing 2'×4' florescent lighting fixture in that the existing florescent tubes, ballast and lens would be replaced by the described lens having the first and second sources of illumination as well as the second power source and other necessary components as explained. For example, an existing ballast may be replaced with the above described second source of power (e.g., battery) and circuitry such as an LED driver and may include the above described switch. If the switch were so included, the replacement circuitry could further include the ability to remotely control the fixture through the switch. Moreover, implementation of the present invention would further include a controller such that a user would be provided control of both the first and second sources of illumination and be provided light even in the event of a loss of normal power.

Of course, the above described example is merely one of many different implementations of the present invention. For example, rather than replace an existing lens with an inventive lens including a first and a second source of illumination, second power source, etc., the present invention further considers replacing a parabolic reflector assembly with an inventive parabolic assembly. In such an implementation, the first and second sources of illumination may be placed at locations on or coupled to the new parabolic assembly such that the existing parabolic reflector, as well as the existing florescent lights, and ballast can be removed while the housing of the existing fixture is kept in place. Moreover, the second source of power and other components as described above may be configured for installation in a location within the housing at which the ballast was previously located. In that case, the inventive lighting fixture may be installed as a back-fit or retro-fit such that a user can maintain an existing location of a housing while replacing a high energy florescent lighting system with a low energy LED based system and be provided with a source of illumination even if a normal source of power is lost. The user is thus provided with a lower energy requirement while also being provided with a source of emergency or back-up lighting.

Still further, the inventive lighting fixture may be implemented so as to replace a 1'×8' florescent lighting installation. In such an installation, the existing fixture is typically provided with a curved back plate that reflects light illuminated from a florescent tube. In implementing the inventive fixture and controller of the present invention, the curved back plate may be replaced with a new back plate having a first and a second source of illumination thereon. Moreover, the ballast of the existing fixture may be removed and a second source of power may be installed at or near the same location.

Figure 2:
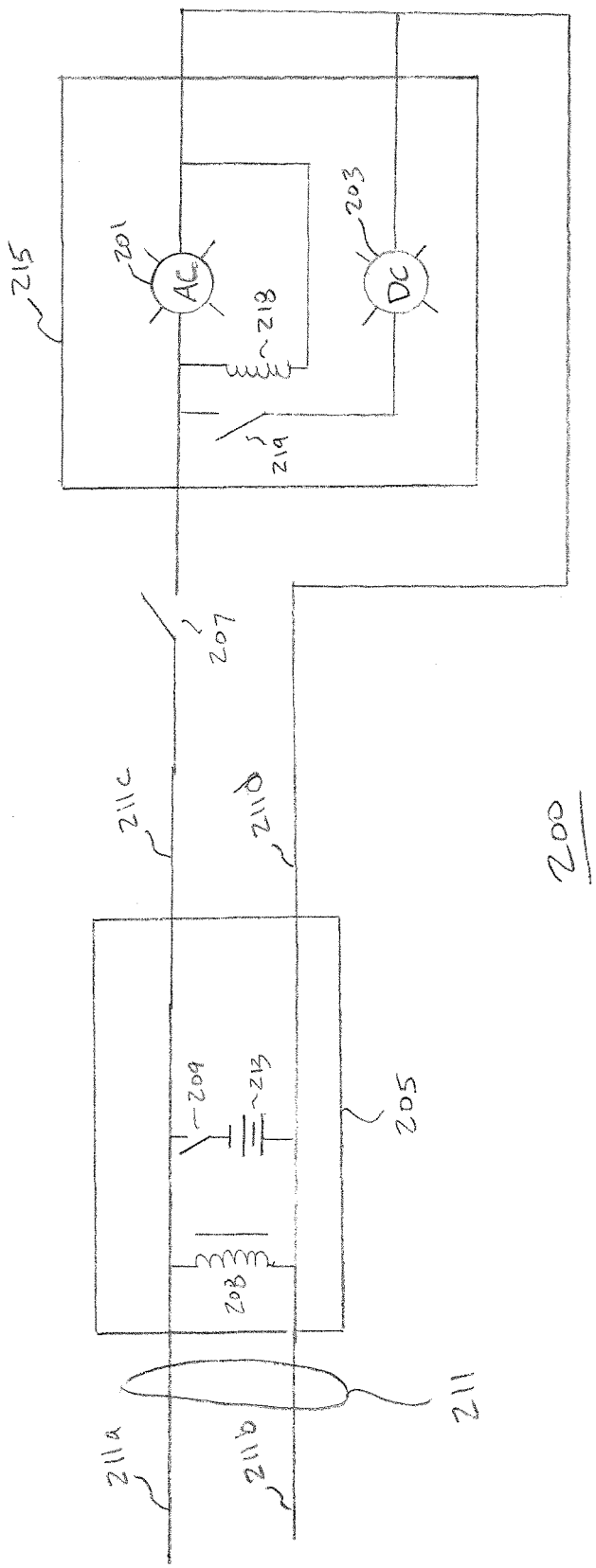
FIG. 2 illustrates another lighting apparatus having first and second sources of power, first and second illumination sources and a circuit for controlling the same in accordance with an exemplary embodiment of the present invention.

FIG. 2 illustrates another lighting apparatus having first and second sources of power, first and second illumination sources and a circuit for controlling the same in accordance with an exemplary embodiment of the present invention.

Referring to FIG. 2, the lighting apparatus 200 includes a first illumination source 201, a second illumination source 203, a controller 205, a first source of power 211, a second source of power 213, and a lighting fixture 215. Notably, the elements illustrated in FIG. 2 are similar to those illustrated in FIG. 1 and thus a detailed description will not be provided for sake of brevity.

As illustrated in FIG. 2, the present invention may be implemented in any of a plurality of ways. For example, as illustrated in FIG. 2, the second source of power 213 is located remotely from the second illumination source 203. In this case, the lighting fixture 215 may be implemented as a single unit, much like a typical incandescent or florescent light bulb that is coupled to a socket in a lamp. However, as illustrated in FIG. 2 and as will be explained, the inventive lighting fixture 215 includes both the first illumination source 201 and the second illumination source 203 such that, upon a loss of normal power, the lamp remains able to provide lighting for a user.

In more detail, the lighting fixture 215 includes the first illumination source 201, the second illumination source 203, a second relay 218 and a second contact 219. As in the embodiment of FIG. 1, the second relay 218 detects if a normal source of power is provided to the first illumination source 201. The second contact 219 is controlled by the second relay 218. In an exemplary embodiment, the second contact 219 is a normally closed contact such that, if the second relay 218 is deenergized, the second contact 219 is closed.

The lighting apparatus 200 also includes a switch 207 provided for a user to control the lighting fixture 215. That is, switch 207 is provided such that a user is able to control illumination of the lighting fixture 215 regardless of whether the first source of power 211 or the second source of power 213 is available.

The controller 205 is configured in conjunction with the lighting fixture 215 to provide control of a backup source of power so that a user may selectively switch on or off a backup source of illumination when a normal source of power is lost. As illustrated, the controller 205 includes a first relay 208, a first contact 209 controlled by the first relay 208, and the second source of power 213. In this case, the first relay 208 is able to detect if the first source of power 211 is available. If the first source of power 211 is available, the first relay 208 will be energized and the first contact 209, which is a normally closed contact, will be open. In that case, the second source of power 213 will be isolated from the lighting fixture 215. On the other hand, if the first source of power 211 is not available, the first relay 208 will be de-energized such that first contact 209 is closed. In that case, the second source of power 213 will be provided in a circuit with the second illumination source 203 and the switch 207 such that a user will be able to selectively illuminate the lighting fixture 215.

In an exemplary implementation as discussed briefly above, the lighting fixture 215 may be configured as a single unit that is configured for coupling to an existing device, such as a lamp. In that case, the lighting fixture 215 may have a yoke or other structure such that the lighting fixture 215 may be screwed into a receptacle on the lamp. Also, the switch 207 may be a rotary switch located on or near the lamp, proximate the receptacle, in line with one of conductors 211c and/or 211d, or the like. Moreover, as described with reference to FIG. 1, the switch 207 may be any type of switch including a remotely controlled switch, an occupancy sensing switch, a toggle switch, etc.

In an exemplary implementation, the controller 205 may be implemented having a structure similar to what is commonly termed a power strip. That is, the controller 205 may be implemented having a plurality of outlets, each of which is provided power from the first source of power 211. Further, if implemented as a power strip, the controller 205 may have one outlet dedicated for the control of the lighting fixture 215. For example, the controller 205 may be configured having six outlets wherein one of the six outlets is provided with an electrical connection to the first source of power 211, the second source of power 213, and the first contact 209, while the remaining five outlets are provided with an electrical connection only to the first source of power 211. Of course, the above is merely for example and the controller 205 may be provided having any number of outlets, and any number of or all of the provided outlets may be electrically coupled to the second source of power 213 and the first contact 209.

Moreover, the controller 205 may be provided with an Arc Fault Circuit Interrupter (AFCI), a Ground Fault Circuit Interrupter (GFCI), or other components to provide additional functions and/or protection. Also, the controller 205 may further include circuitry for charging the second power source 213 if it is implemented as a battery, signaling such as a light or a status bar, to provide an indication of the battery's state of charge, and other circuitry for additional control and/or indication of the lighting apparatus 200 as needed. Moreover, the second power source may be any of a rechargeable battery, a replaceable battery, a solar powered device, a capacitor, and the like.

Although not illustrated, the present invention further includes a plurality of lighting fixtures 215 controlled by a single controller 205. Similarly, the present invention further includes a plurality of lighting fixtures 115 controlled by a single controller 105. That is, the present invention includes an embodiment in which a single controller (e.g., 105, 205, etc.) is provided to control a plurality of lighting fixtures (e.g., 115, 215, etc.). In that case, the second source of power (e.g., 113, 213, etc.) may be sized differently depending on the number of lighting fixtures. For example, in an implementation similar to that illustrated in FIG. 2, if 10 lighting fixtures similar to lighting fixture 215 were controlled by a single controller, similar to controller 205, the power requirements and thus size of the second source of power 213 would similarly increase as compared with the power requirements and size of the second source of power 213 if only a single lighting fixture were controlled. Also, if 10 lighting fixtures were so controlled, each of the lighting fixtures may include additional control circuitry so as to be individually selected for illumination by the controller 205. For example, each of the lighting fixtures may include control circuitry such that a user may remotely or locally select the lighting fixture. As an example, if the user were to determine that the first source of power 211 was unavailable for an extended period of time, the user may wish to reduce the electrical load on the second source of power 213 to reduce its consumption, especially if implemented as a battery. In that case, each of the lighting fixtures may be provided with locally or remotely controlled circuitry that would allow the user to selectively turn on or off the fixture without affecting the control of the remaining fixtures.

Again, such control circuitry may be provided to allow local control of the fixture, such as by a switch (rotary, toggle, dimming, etc.). The control circuitry my additionally be provided to allow remote control of the fixture. In that case, each fixture may include dip or other switches such that a single remote control device would be able to individually control each fixture. Alternatively, the dip or other switches may be remote to the fixture while still allowing a user to remotely control each fixture individually.

Moreover, the fixtures in conjunction with the controller may be configured for remote control as a system. For example, the controller (e.g., 105, 205, etc.) may be configured with circuitry to transmit and/or receive signals from a remote device under the control of a cellular phone. That is, the controller and/ or fixture may be configured with a wireless device able to transmit and/or receive signals using any of known communication protocols (e.g., RF, WiFi, LAN, IP, Bluetooth, etc.).

Furthermore, while the embodiment described in FIG. 2 included a single lighting fixture described as a bulb that could be screwed into a lamp, the invention is not so limited. For example, the lighting fixture 215 may be implemented in conjunction with any type of existing lighting fixture, such as a recessed light. As an example, the recessed light may be a 2'×4' light currently housing one or more florescent tubes. In accordance with an example of the present invention, the florescent tubes may be replaced with a lighting fixture 215 including a first source of illumination 201, a second source of illumination 203, a second relay 218 and a second switch 219. In that case, the first source of illumination 201 and the second source of illumination 203 may each comprise one or more LEDs. Furthermore, in such an installation, if a florescent bulb is replaced with a lighting fixture 215 as described herein, the controller 205, as well as other components such as the second power source 213 and necessary control circuitry, may be located in place of a ballast typically provided with a florescent light.

In still another embodiment, the controller 205, the second power source 213, and/or other components may be installed in conjunction with a service panel for a residential or commercial building. As an example, a slot for a breaker in such a panel may be configured for connection with the controller 205 such that, when a loss of power is detected to the panel by the first relay 208, the second power source 213 is available to provide energy to the service panel and therefore provide power to any fixture 215 that is installed on a branch circuit throughout the building. In various embodiments, the controller 205, including any or all of the first relay 208, the first contact 209 and the second power source 213, may be installed within the service panel, adjacent or abutting the service panel, or a short distance away from the service panel, depending on variables such as the size of the various components. For example, if implemented as a battery, the location of the components may depend upon the size of the second power source 213. Notably, an advantage of such an implementation is that a single second power source 213 may be provided for back-up power for a building, thus reducing the installation and maintenance costs. Furthermore, the controller 205 may be implemented in conjunction with a surge arrestor to provide protection to the service panel and building in case of a voltage spike event, such as a lightning strike.

Figure 3:
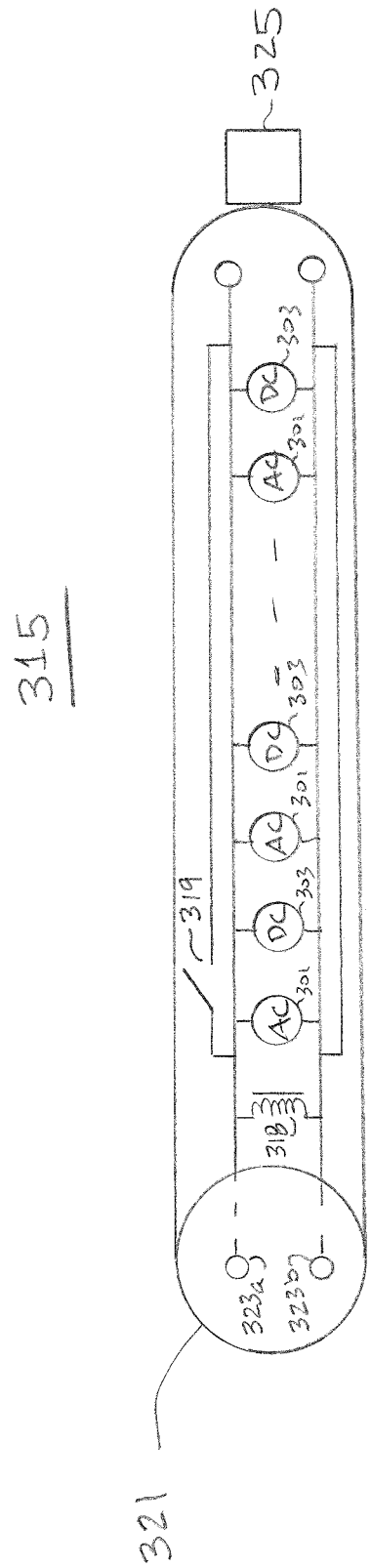
FIG. 3 illustrates a lighting fixture in accordance with an exemplary embodiment of the present invention.

FIG. 3 illustrates a lighting fixture in accordance with an exemplary embodiment of the present invention.

Referring to FIG. 3, lighting fixture 315 includes one or more first illumination source 301, one or more second illumination source 303, a second relay 318, a second switch 319, and a connector 321 which includes a first connecting pin 323a and a second connecting pin 323b.

Lighting fixture 315 is similar to the previously described lighting fixtures 115 and 215 in that it includes first and second illumination sources 301 and 303 that are illuminated by separate power sources (not shown). Moreover, lighting fixture 315 may be configured for installation in an existing structure, such as an existing 2'×4' recessed light. In that case, the lighting fixture 315 may be configured having a 4' length such that it may be installed using the existing receptacles (e.g., tombstones) in the recessed light. That is, the first connecting pin 323a and the second connecting pin 323b may be configured for coupling with an existing receptacle in a recessed light. Further, although not illustrated, installation of the lighting fixture 315 in an existing recessed light may be accompanied by installation of a controller (e.g., 105, 205, etc.) and other circuitry/components (e.g., second power source, LED driver, etc.) as a replacement for a ballast typically used in a recessed light. In that case, and similar to that already described, an existing lighting installation may be retrofit using the inventive lighting fixture 315 and a controller (not shown) such that a user is provided a source of light despite the loss of a normal source of power.

Moreover, lighting fixture 315 may be configured so as to be coupled with one or more lighting fixture 315 using connector 321. That is, lighting fixture 315 may be configured to have a given length, for example 2', such that, when it is desired to retrofit a lighting installation having a plurality of 2'×4' recessed lights, two 2' lighting fixtures 315 may be connected to provide a single lighting fixture having a total length of 4'. Similarly, if it is desired to retrofit a 1'×8' recessed lighting installation, four lighting fixtures 315 may be coupled using connectors 321 so as to provide a single lighting fixture having a total length of 8'.

Connector 321 may be configured having any of a plurality of arrangements. For example, as illustrated in FIG. 3, connector 321 may include a first connecting pin 323a and second connecting pin 323b configured having male orientation on one end of lighting fixture 315 and female orientation on an opposite end of lighting fixture 315. In that case, coupling may be established between two lighting fixtures 315 using the male and female oriented connecting pins. That is, to couple two or more lighting fixtures 315 together to achieve an extended lighting fixture, the connectors are used to provide an electrical connection. In that regard, once the desired length of fixture is achieved, the resultant extended fixture would have a male oriented connector 321 at one end and a female oriented connector at the opposite end. Accordingly, though not illustrated, the extended lighting fixture would further include a female-to-male adaptor to provide connecting pins, similar to connecting pins 323a and 323b, at both ends of the extended fixture. Using the adaptor, the extended fixture would then be capable of electrically connecting with a receptacle (e.g., tombstone) of a lighting housing.

In other exemplary embodiments, connector 321 may include a spring loaded connector, a rotatable connector, a slide-able connector, a press fit connector, a gang-interlocking connector, a transparent connector, and the like. Also, the connector 321 may include indications regarding the status of the lighting fixture 315, similar to those previously described. For example, connector 321 may include an indication regarding a status of a battery (not shown) located internally to or remotely from the lighting fixture, and the like. And again, similar to the discussion above regarding the example of FIG. 1, while the first illumination source 301 is illustrated as "AC," it is to be understood that this is merely for convenience of description. That is, the first illumination source 301 may be any of an incandescent bulb, a florescent bulb, an LED, etc., which may each be powered by a different and/or distinct type of power. Accordingly, although not illustrated, it is understood that the lighting apparatus may include additional elements as may be needed to regulate, control, or otherwise provide proper operation of the first illumination source 301. For example, although not illustrated, it is to be understood that, if the first illumination source 301 is implemented as an LED, the lighting apparatus may further include circuitry necessary to rectify and control the power of a first source of power to supply DC power to the LED. As a specific example, the lighting apparatus may include an LED driver for either or both the first illumination source 301 and the second illumination source 303. Also, if both the first and second illumination sources are implemented using LEDs, the first illumination source 301 and the second illumination source 303 may include a different number of LEDs, different types of LEDs, and the like. For example, the first illumination source 301 may include a greater number of LEDs than the second illumination source 303, or include LEDs having a greater output (e.g., higher lumens) that the LEDs of the second illumination source 303. It is also to be understood that, if so implemented, the number and rating of the LEDs of the second illumination source 303 may vary depending on a variety of factors, such as the location of the lighting fixture 315, the rating of a second source of power, the need for back up lighting based on safety concerns and the like, and similar factors.

In another exemplary embodiment, lighting fixture 315 may include a receptacle 325. The receptacle 325 may be coupled to the lighting fixture by means of the connector 321 on either end of the lighting fixture 315 or otherwise electrically coupled to the lighting fixture 315 at any location. The receptacle 325, in conjunction with additional circuitry provided internal to lighting fixture 315 (not shown), is provided for docking or other installation of a transceiver. The transceiver, in conjunction with circuitry internal to the lighting fixture 315, may be used for reception and/or transmission of control information, indication information, and the like. For example, the user may have a local transceiver configured for communication with the transceiver coupled to the lighting fixture 315. In that case, the user may use the local transceiver to control the lighting fixture 315. For example, the user may control the lighting fixture 315 such that it is selectively illuminated upon loss of a normal source of power. Further, if the lighting fixture 315 to which the receptacle 325 is attached is one of a plurality of lighting fixtures configured to establish a single lighting fixture having a certain length, for example, if the lighting fixture 315 is one of four lighting fixtures coupled together by means of connectors 321 to establish an 8' light, the transceiver coupled to the connector 321 may be used, in conjunction with control circuitry internal to the lighting fixture 315, to select one or more of the four lighting fixtures for illumination upon loss of normal power. Furthermore, the transceiver may provide status or other information to the user. For example, the transceiver may provide status information of a second source of power (e.g., battery) located either internally or remotely from the lighting fixture 315, status information regarding the second illumination source, etc.

Furthermore, while not illustrated, the lighting fixture 315 may be provided with two or more receptacles 325. As discussed above, a first receptacle 325 may be provided for docking or other installation of a receiver. According to an exemplary embodiment, a second receptacle 325 may be provided for establishing an electrical connection for lighting fixtures that are not otherwise electrically connected. For example, if a plurality of lighting fixtures 315 are installed as a retrofit for an array of recessed lights, each of the lighting fixtures 315 may be electrically connected using a second receptacle 325. In that case, a user would be able to selectively control each of the lighting fixtures 315 remotely. For example, using a single transceiver docked or otherwise installed in a first receptacle 325 of the array of lighting fixtures 315, a user may selectively control each of the plurality of lighting fixtures 315.

Although not illustrated, the present invention further includes a variety of power, control, indication and other circuitry that should be apparent to one of skill in the art. For example, although not illustrated in detail, the present invention also includes circuitry for various operations of the lighting apparatus 100, the lighting apparatus 200 and/or the lighting fixture 315. More specifically, while not illustrated, the present invention further includes any number of additional circuits for various operations of the second source of illumination (e.g., 103, 203, 303). For example, the present invention further includes circuitry such as a switch or relay for isolating the second illumination source from the first source of power. Moreover, the present invention further includes circuitry for properly charging, isolating or otherwise controlling the second source of power. For example, the present invention may further include rectifying and controlling circuitry for converting AC power to DC power to properly charge the second source of power if it is implemented as a battery.

Again, the above examples are merely provided to illustrate the many different ways in which the present invention may be implemented. They are not to be construed as limiting. Instead, embodiments of the present invention include providing a first source of illumination and a second source of illumination in any of a variety of locations when implemented as either a new or a back-fit installation. For example, the first and second sources of illumination may be placed on a frame, a lens, a grille, a reflector, or any location that provides ease of installation or design, increased light efficiency, or based on any other parameter of importance to the designer or user.

Also, if the second source of power is implemented as a battery, the battery may be located within the lighting fixture or remotely from the lighting fixture. If located within the lighting fixture, the battery may be placed in any of a variety of locations of the lighting fixture. For example, if the lighting fixture is configured having a yoke for insertion into an existing lighting socket, such as a socket having threads for rotatably receiving the lighting fixture, the battery may be located within the yoke, may be located away from the yoke such as near a lens of the lighting fixture, and the like. Also, the battery may be configured to be attachable to the lighting fixture. For example, the battery and one or more LED of the second source of illumination may be configured separately from the first illumination source.

What is claimed is:

1. In combination, a branch circuit for distributing power to a light fixture and an emergency lighting system for operating the light fixture during at least one of a normal operation and an emergency operation, the emergency lighting system consisting of:
at least one light fixture, the at least one light fixture having first and second distinct illumination sources;
a first source of power for supplying power to the at least the first distinct illumination source, the first source of power being placed in electronic communication with the first distinct illumination source through the branch circuit, wherein the first source of power comprises an AC power source;

a second source of power for supplying secondary power to the second distinct illumination source, the second source of power being placed in electronic communication with the second distinct illumination source through the branch circuit, wherein the second source of power comprises a DC power source;

a pair of relays, each of the pair of relays being in electronic communication with respective first and second sources of power for detecting and responding to an occurrence of power interruption in the first source of power;

at least a pair of switches, each of the at least a pair of switches including a first switch and a second switch being in electronic communication with a respective relay so as to manually and selectively control switching power from the first source of power to the second source of power through the branch circuit, respectively, in response to detection of power interruption in the first source of power via its respective relay, wherein the at least a pair of switches cooperatively operate by manual operation to: a) turn the first distinct illumination source on when the first switch is on and the power from the first source of power is detected as on, b) turn the first distinct illumination source off when the first switch is off and the power from the first source of power is detected as on, c) turn the second distinct illumination source on when the second switch is on and the power from the first source of power is detected as off and the second source of power is on, and d) turn the second illumination source off when the second switch is off and the power from the first source of power is detected as off and the second source of power is on.

2. The emergency lighting system of claim 1, wherein the lighting fixture includes a plurality of lighting fixtures.

\* \* \* \* \*